(12) United States Patent
Lu

(10) Patent No.: US 7,174,453 B2
(45) Date of Patent: Feb. 6, 2007

(54) MESSAGE SCREENING SYSTEM

(75) Inventor: Larry L. Lu, Great Falls, VA (US)

(73) Assignee: America Online, Inc., Dulles, VA (US)

( * ) Notice: Subject to any disclaimer, the term of this patent is extended or adjusted under 35 U.S.C. 154(b) by 838 days.

(21) Appl. No.: 09/801,932

(22) Filed: Mar. 9, 2001

(65) Prior Publication Data

US 2002/0107950 A1 Aug. 8, 2002

Related U.S. Application Data

(60) Provisional application No. 60/258,902, filed on Dec. 29, 2000.

(51) Int. Cl.
*H04L 12/58* (2006.01)
*G06F 17/60* (2006.01)

(52) U.S. Cl. ............... 713/154; 709/203; 709/206; 709/224; 709/229; 707/10; 726/13

(58) Field of Classification Search ........ 713/154, 713/200; 709/203, 224, 229, 206; 707/10; 379/10; 726/13
See application file for complete search history.

(56) References Cited

U.S. PATENT DOCUMENTS

| 5,101,424 | A | * | 3/1992 | Clayto et al. ............... 379/10 |
| 5,619,648 | A | * | 4/1997 | Canale et al. ........... 395/200.01 |
| 5,796,948 | A | * | 8/1998 | Cohen .................... 395/200.36 |
| 5,835,722 | A | | 11/1998 | Bradshaw et al. |
| 5,999,932 | A | * | 12/1999 | Paul ........................... 707/10 |
| 6,065,056 | A | * | 5/2000 | Bradshaw et al. .......... 709/229 |
| 6,076,100 | A | * | 6/2000 | Cottrille et al. ............ 709/203 |
| 6,112,227 | A | * | 8/2000 | Heiner ....................... 709/203 |
| 6,128,739 | A | * | 10/2000 | Fleming et al. ............ 713/200 |
| 6,167,450 | A | * | 12/2000 | Angwin et al. ............ 709/227 |
| 6,393,464 | B1 | * | 5/2002 | Dieterman ................. 709/206 |
| 6,519,639 | B1 | * | 2/2003 | Glasser et al. ............. 709/224 |
| 6,854,074 | B2 | * | 2/2005 | McLellan et al. ............ 714/39 |
| 2002/0049806 | A1 | * | 4/2002 | Gatz et al. ................. 709/203 |
| 2004/0019650 | A1 | * | 1/2004 | Auvenshine ............... 709/206 |
| 2004/0181690 | A1 | * | 9/2004 | Rothermel et al. ......... 713/201 |

FOREIGN PATENT DOCUMENTS

| EP | 0375 138 A2 | * | 6/1990 |
| EP | 1079 318 A2 | * | 2/2001 |

(Continued)

OTHER PUBLICATIONS

SpectorSoft Corporation, Industry Leading Spy Software Company Announces Instant Messaging Feature in Spector Professional Edition, Apr. 24, 2002.*

(Continued)

*Primary Examiner*—Taghi T. Arani
(74) *Attorney, Agent, or Firm*—Fish & Richardson P.C.

(57) ABSTRACT

A message screening system includes routing to a supervisory recipient an instant message or a chat room message directed to an intended recipient. The supervisory recipient then is allowed to screen the instant message or the chat room message by approving or rejecting the message. The instant message or the chat room message then is forwarded to the intended recipient if the message is approved by the supervisory recipient.

36 Claims, 3 Drawing Sheets

FOREIGN PATENT DOCUMENTS

EP         1 209 866 A2 *  5/2002
WO      WO 00/68815        11/2000

OTHER PUBLICATIONS

SpectorSoft Corporation, SpectorSoft Corporation Ships Major Upgrade of eBlaster, Aug. 21, 2002.*

Press Release, SpectorSoft Corporation, SpectorSoft Announces New Version of Award Winning Spector Software, May 18, 2000.*

Nigel Miller, Can an employer monitor its employees' E-mal?, Computer Audit Update, May 1997, pafges 30-31.*

The Wall Street Journal article, "Esniff Ferrets Out Misbehavior By 'Reading' E-Mail, Web Visits," Katherine Lange, interactive.wsj.com, Apr. 27, 2001:Tech Q&A.

The Early Report-The Early Show segment, "Big Brother In The Corner Office," Julie Chen, cbsnews.com/earlyshow/caught/techage/20001228e_sniff.shtml, Dec. 28, 2000:Tech Age.

"The eSniff Product Overview," eSniff: Define Your e-Boundaries, www.esniff.com/product_overview.html, May 15, 2001.

* cited by examiner

MESSAGE SCREENING SYSTEM

This application claims priority from U.S. Provisional Application No. 60/258,902, filed Dec. 29, 2000, which is incorporated herein by reference.

TECHNICAL FIELD

This invention relates to screening electronic messages.

BACKGROUND

In some instances, parents and employers may want to supervise their children's and employees' Internet access to prevent improper use, such as receipt of inappropriate content or communications. This supervision may involve "eyes-on" supervision by parents or employers to prevent communication by or with undesirable elements. For instance, a parent or an employer may choose to physically prevent Internet access by the child or the employee until after the parent or the employer has reviewed received messages or to maintain "eyes-on" supervision while the child or the employee is online.

SUMMARY

In one general aspect, electronic messages may be routed by routing an electronic message directed to an intended recipient to a supervisory recipient and enabling the electronic message to be screened by the supervisory recipient. Implementations may include one or more of the following features. For example, routing the electronic message may include notifying the intended recipient that the electronic message has been routed to the supervisory recipient. Routed electronic messages may include email, instant or chat room messages.

In some implementations, screening the electronic message may include allowing the supervisory recipient to approve or reject the electronic message, and forwarding the approved electronic message to the intended recipient. Screening the electronic message also may include comparing an electronic address of a sender of the electronic message to a sender list, and approving or rejecting the electronic message based on a result of the comparison. The sender list may include a list of approved senders to compare the electronic address of the sender to the list of approved senders. Alternatively, or additionally, the sender list may include a list of blocked senders to compare the electronic address of the sender to the list of blocked senders.

In some implementations, a supervisory recipient may be designated for an intended recipient. For example, the intended recipient may be a minor child and the supervisory recipient may be a guardian for the minor child. The intended recipient and the supervisory recipient may have related accounts within an electronic mail service. Additionally, the intended recipient and the supervisory recipient may have unique screen names comprising a single Internet service provider account. Alternatively, the intended recipient and the supervisory recipient may have unrelated accounts.

Implementations may include a method or process, an apparatus or system, or computer software on a computer medium. The details of one or more of the implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1A:
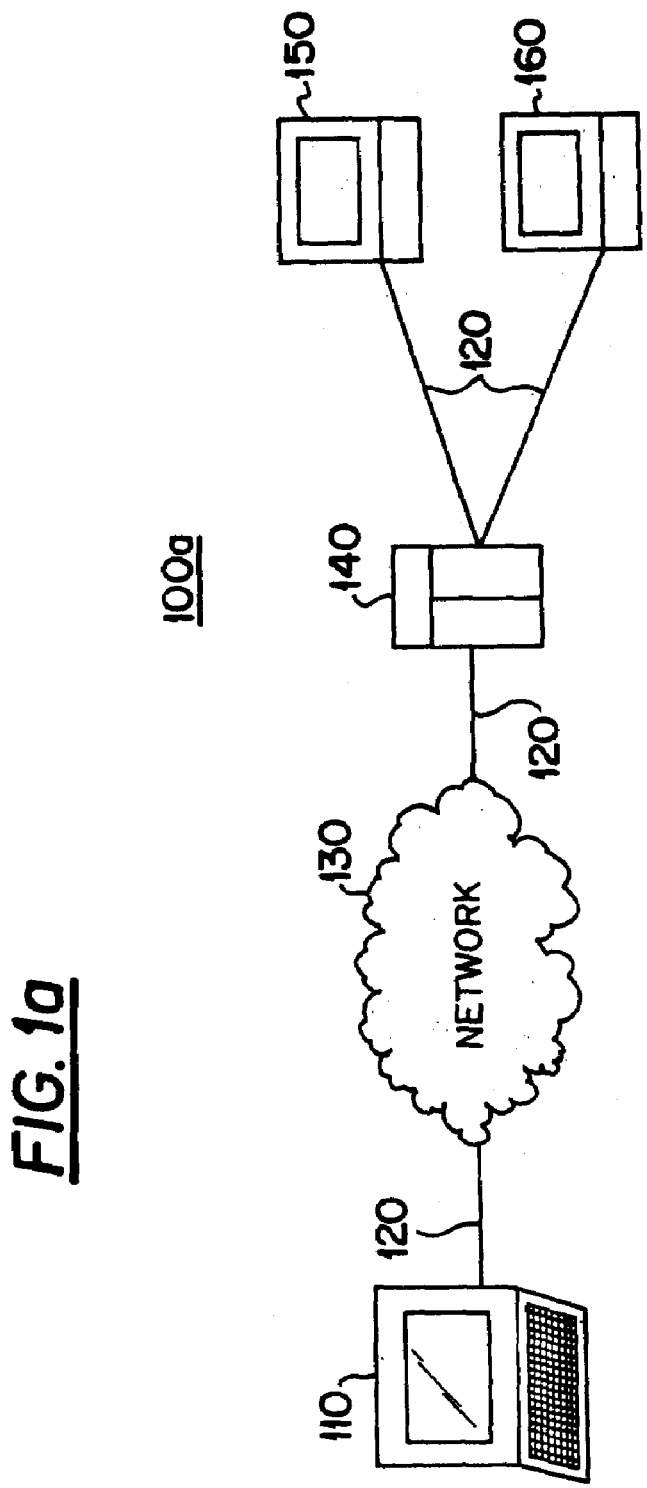
FIGS. 1a and 1b are schematic diagrams of a message screening system.

Referring to FIG. 1a, a message screening system 100a includes sender 110, communication links 120, delivery network 130, server 140, intended recipient 150, and supervisory recipient 160.

Figure 1B:
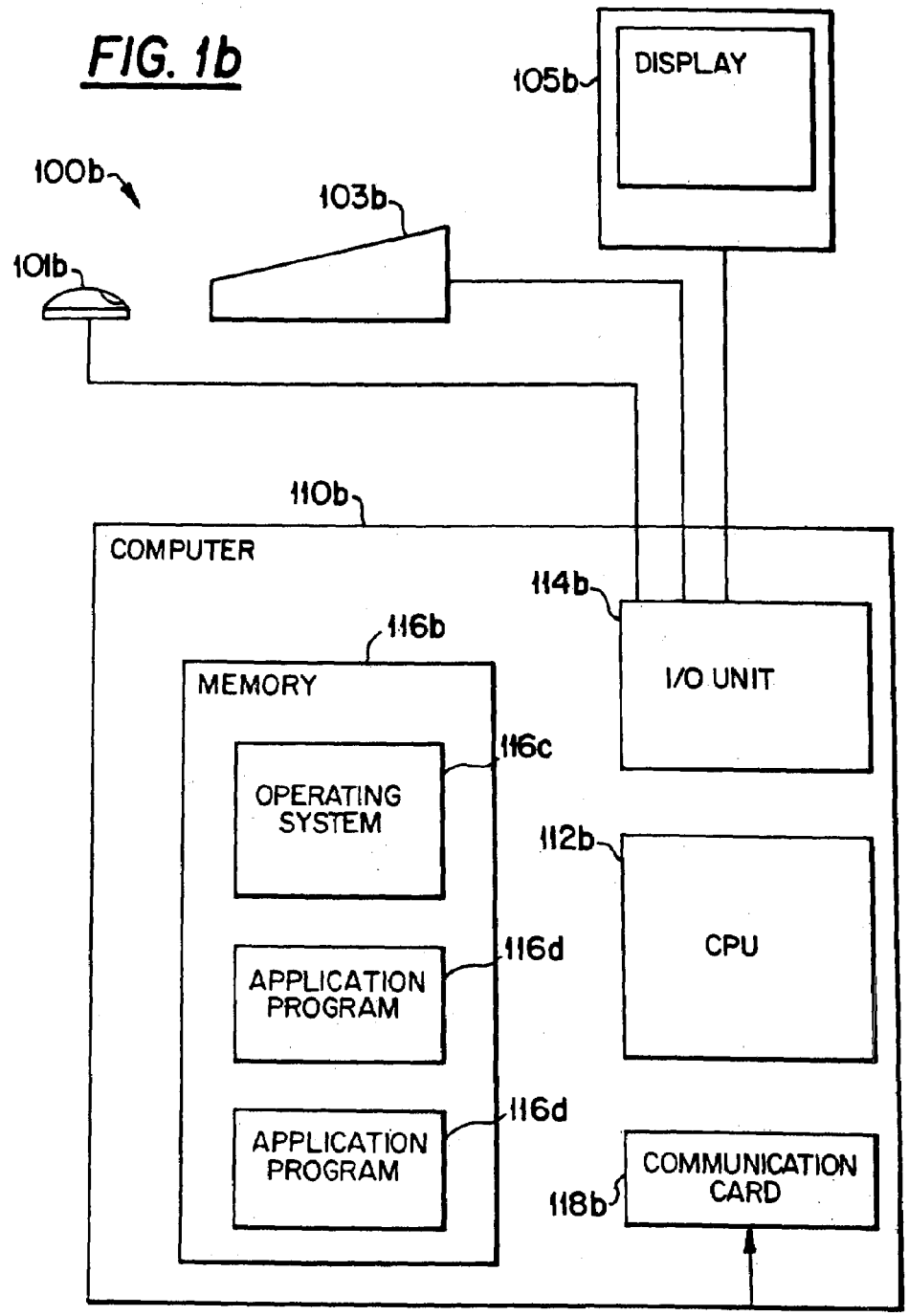

Sender 110 may be a computer programmed or configured to send an electronic message, such as hardware setup 100b described with reference to FIG. 1b. Hardware setup 100b may include various input/output (I/O) devices (e.g., mouse 101b, keyboard 103b, and display 105b) and a general purpose computer 110b having central processor unit (CPU) 112b, an I/O unit 114b, and memory 116b that stores data and various programs, such as an operating system 116c and one or more application programs 116d. Computer system 110b also typically includes some sort of communications card or device 118b (e.g., a modem or a network adapter) for exchanging data with a network.

Alternatively, sender 110 may be implemented by another type of machine or device capable of sending an electronic message. Examples of electronic messages include e-mail, chat room, private chat room, instant messaging, bulletin board postings, and other systems for transmitting text or graphics images to recipients. In other implementations, sender 110 may send a non-electronic message such as a letter, an audio or video message, or a light modulated message.

Sender 110 may be connected to delivery network 130 by communication link 120. Communication link 120 may include one or more communication pathways that enable communications through one or more delivery networks, such as wired, wireless, cable, or satellite communication pathways. Examples of delivery networks 130 may include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The Internet is a global network connecting millions of computers using a decentralized design.

Delivery network 130 may be connected by communication link 120 to message screening (MS) server 140, which is capable of handling message screening functions. AMS server 140 may include a computer. Alternatively, MS server 140 may include a multi-purpose device, or other devices capable of managing message screening functions. Message screening functions may include redirecting messages from an intended recipient to a supervisory recipient, concurrent with or instead of directing those messages to the intended recipient. The messages to be directed by delivery network 130 to the supervisory recipient may be filtered or otherwise identified based on predetermined criteria or in other ways.

MS server 140 may be connected by communication link 120 to intended and supervisory recipients 150, 160. Intended and supervisory recipients 150, 160 generally are capable of communicating electronic messages and information with the MS server 140 and each other. For example, intended and supervisory recipients 150, 160 may include personal computer systems or other electronic devices such as a pager, a personal digital assistant, or a wireless telephone for communicating electronic messages. Moreover, intended and supervisory recipients 150, 160 may include software stored on a computer system with different screen names and passwords enabling access to different accounts. In one implementation, intended recipient 150 includes software enabling access by a minor child, and supervisory recipient 160 includes software enabling access by the child's parent or guardian. In another implementation, intended recipient 150 includes software enabling access by an employee and supervisory recipient 160 includes software enabling access and/or supervision by an employer.

Figure 2:
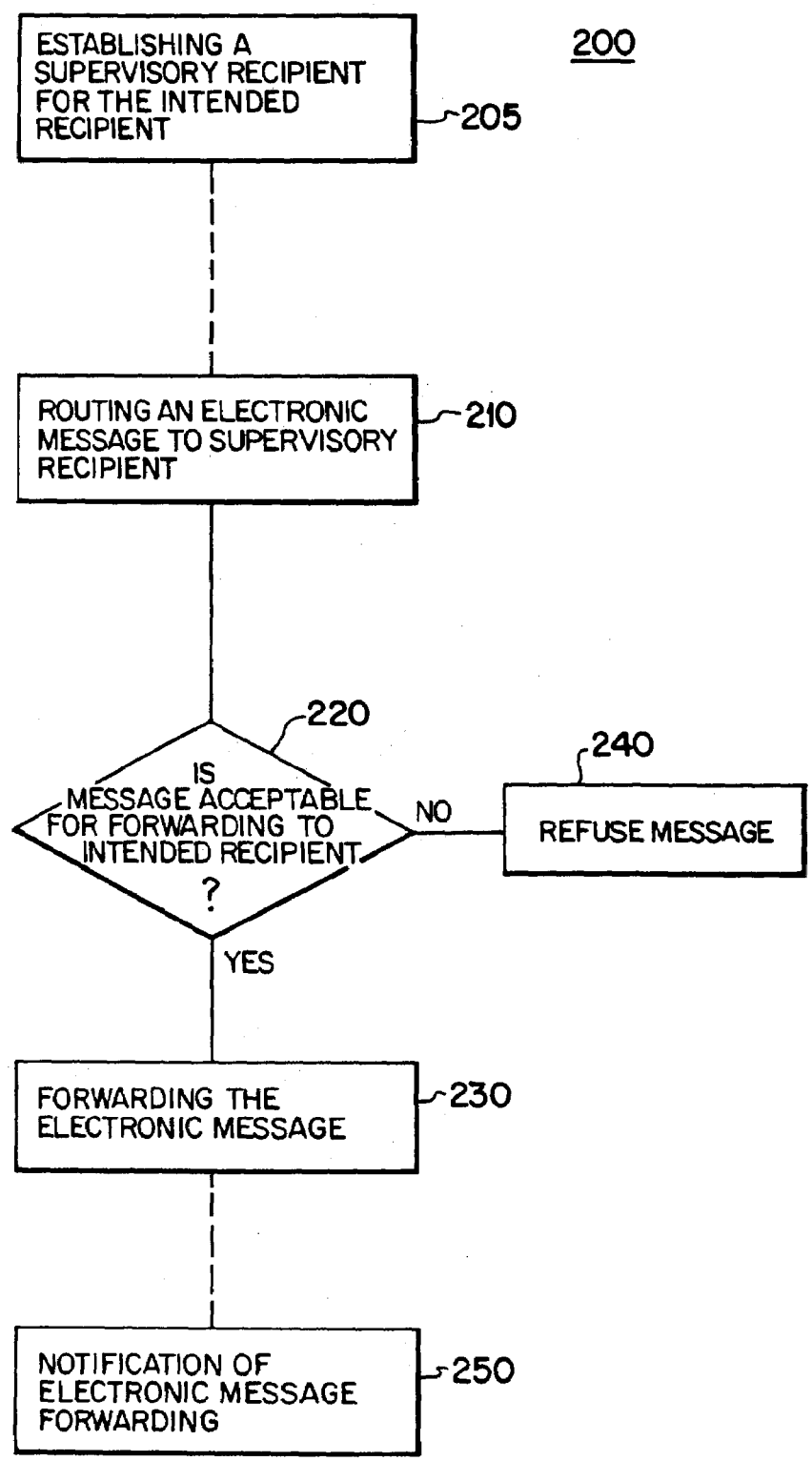
FIG. 2 is a flow chart of a method of message screening.

Referring to FIG. 2, a process 200 for message screening includes receiving an electronic message directed to an intended recipient and directing that electronic message to a supervisory recipient (step 210), enabling screening of the electronic message by the supervisory recipient (step 220), and forwarding an approved electronic message to the intended recipient (step 230). The method 200 for message screening also may include establishing a supervisory recipient for the intended recipient (step 205) and/or notifying the intended recipient (step 250) that one or more messages have been screened.

Establishing a supervisory recipient (step 205) may include, for example, storing the related electronic address of the supervisory recipient 160 for the intended recipient 150 in the memory or storage of MS server 140.

Receiving an electronic message (step 210) generally is performed by examining the header of the electronic message for an electronic address corresponding to intended recipient 150, determining whether the electronic address of intended recipient 150 corresponds to an intended recipient that is subject to supervisory screening, and routing the electronic message to supervisory recipient 160 if the address corresponds to an intended recipient subject to supervisory screening.

More specifically, using the electronic address of intended recipient 150 specified in the electronic message or otherwise obtained, MS server 140 determines the electronic address of supervisory recipient 160 by, for example, referring to a database or lookup table. MS server 140 then may route the electronic message automatically to an appropriate supervisory recipient 160 corresponding to intended recipient 150.

The electronic message may be routed to supervisory recipient 160 in addition to intended recipient 150, or it may be routed to supervisory recipient 160 in lieu of intended recipient 150. In one implementation, the message screening system may be configured to enable review by supervisory recipient 160 without preventing or delaying receipt by intended recipient 150. This can be performed by, for example, sending the electronic message concurrently to both intended recipient 150 and supervisory recipient 160. Alternatively, the supervisory recipient 160 may be given a certain time period to screen and approve an electronic message, after which a default condition may be established to automatically forward the electronic message to the intended recipient 150 or to permanently delete the electronic message. In any case, receipt of the message by supervisory recipient 160 may be performed with or without notice to intended recipient 150. Furthermore, an electronic message may be directed to one or more supervisory recipients 160.

Enabling screening of the electronic message by the supervisory recipient (step 220) may include reviewing the electronic message. Supervisory recipient 160 may be provided with a viewing screen having one or more control panels that allow supervisory recipient to approve or reject the electronic message for receipt by intended recipient 150.

The message screening system may be configured to automatically screen an electronic message. For example, lists of approved or blocked senders 110 may be stored at supervisory recipient 160, or otherwise, to enable automatic screening of predesignated message types or sender identifications. In one implementation, during the screening process, the sender 110 may be added to the lists of approved or blocked senders by the supervisory recipient 160. In another implementation, the MS server 140 may compare the electronic address of sender 110 to the list of approved or blocked senders 110 and, based on the comparison, either forward the message, reject the message, or allow supervisory recipient 160 to screen this message of senders 110 personally, or otherwise. Approval may include a manual procedure performed by supervisory recipient 160 such as entering a command or pressing a key. Approval also may be a default condition that is presumed to exist after a certain time period of inaction by supervisory recipient 160 after receiving the electronic message. In general, MS server 140 generally forwards the electronic message to intended recipient 150.

Forwarding an approved electronic message to the intended recipient (step 230) generally includes automatically routing the electronic message to the intended recipient if the message is deemed acceptable for forwarding (in step 220). For example, sender 110 may be included on a list of approved senders. Conversely, if the message is not deemed acceptable for forwarding, the message may be refused (step 240). For example, the message may be refused by deletion of the message. In another implementation, the sender may receive or access a message indicating that the electronic message sent to intended recipient 150 was refused.

Refusal may occur after sender 110 is added to a list of senders whose messages are automatically refused. In yet another implementation, if a threshold number of electronic messages from a sender 110 are refused, the sender may be added to a list of senders to be refused or blocked and all further electronic messages from that sender 110 may be automatically refused or blocked, as appropriate.

Referring again to FIG. 2, message screening 200 also may include notifying the intended recipient that the electronic message has been routed to the supervisory recipient (step 250). The notification may include, for example, an electronic message or a pop-up screen sent by MS server 140 that alerts intended recipient 150 that the electronic message has been routed to supervisory recipient 160.

In the examples described above, supervisory recipient 160 and intended recipient 150 may have related accounts, they may have unique screen names as part of a shared Internet service provider (ISP) account, or they may have unrelated accounts.

A number of implementations of the message screening system have been described. Nevertheless, it will be understood that various modifications may be made without departing from the spirit and scope of the message screening system. Accordingly, other implementations are within the scope of the following claims.

What is claimed is:

1. A method for monitoring electronic messages that are directed to an intended recipient, the method comprising:
  establishing a supervisory relationship between a supervisory person and an intended recipient, wherein establishing the supervisory relationship between the supervisory person and the intended recipient comprises associating an electronic message address of the supervisory person with an electronic message address of the intended recipient;

receiving electronic messages transmitted across a delivery network from one or more sender devices and directed to the intended recipient;

delivering a first one of the electronic messages to the supervisory person without notifying the intended recipient that the first electronic message has been delivered to the supervisory person;

enabling the supervisory person to review and approve the first electronic message after the first electronic message has been delivered to the supervisory person; and enabling notification of the first electronic message to be provided to the intended recipient only if the supervisory person approves the first electronic message.

2. The method of claim 1 wherein the intended recipient is a minor child and the supervisory person is a guardian for the minor child such that establishing the supervisory relationship between the supervisory person and the intended recipient includes associating an electronic message address of the guardian with an electronic message address of the minor child.

3. The method of claim 1 wherein the intended recipient is an employee and the supervisory person is an employer for the employee such that establishing the supervisory relationship between the supervisory person and the intended recipient includes associating an electronic message address of the employer with an electronic message address of the employee.

4. The method of claim 1 wherein delivering comprises:
examining a header of the first electronic message to determine whether the header includes the electronic message address of the intended recipient;
determining the electronic address of the supervisory person associated with the electronic message address of the intended recipient; and
routing the first electronic message to the electronic message address of the supervisory person.

5. The method of claim 4 wherein the intended recipient and the supervisory person each have different electronic message addresses for a single Internet service provider account.

6. The method of claim 1 further comprising: examining a header of a second one of the electronic messages to determine an electronic address of the sender of the second electronic message;
comparing the determined electronic address of the second electronic message to at least one sender list, and
approving or rejecting the electronic message based on a result of the comparison.

7. The method of claim 6 wherein the at least one sender list includes a list of approved senders such that comparing the determined electronic address comprises comparing the determined electronic address to the list of approved senders.

8. The method of claim 6 wherein the at least one sender list includes a list of blocked senders such that comparing the determined electronic address comprises comparing the determined electronic address to the list of blocked senders.

9. The method of claim 1 wherein the electronic messages are e-mails such that receiving electronic messages includes receiving e-mails transmitted across a delivery network from one or more sender devices and directed to the intended recipient.

10. The method of claim 1 wherein the electronic messages are instant messages such that receiving electronic messages includes receiving instant messages transmitted across a delivery network from one or more sender devices and directed to the intended recipient.

11. The method of claim 1 wherein the electronic messages are chat room messages such that receiving electronic messages includes receiving chat room messages transmitted across a delivery network from one or more sender devices and directed to the intended recipient.

12. The method of claim 1 further comprising: delivering a second one of the electronic messages to the supervisory person without notifying the intended recipient that the second electronic message has been delivered to the supervisory person; and
automatically forwarding or deleting the second electronic message if the supervisory person does not review and approve the second electronic message within a period of time after delivery of the second electronic message to the supervisory person.

13. A system for monitoring electronic messages that are directed to an intended recipient, the system comprising:
at least one processing device: and
a storage device storing instructions for causing the at least one processing device to perform the following operations:
establish a supervisory relationship between a supervisory person and an intended recipient by, at least, associating an electronic message address of the supervisory person with an electronic message address of the intended recipient;
receive electronic messages transmitted across a delivery network from one or more sender devices and directed to the intended recipient;
deliver a first one of the electronic messages to the supervisory person without notifying the intended recipient that the first electronic message has been delivered to the supervisory person;
enable the supervisory person to review and approve the first electronic message after the first electronic message has been delivered to the supervisory person; and
enable notification of the first electronic message to be provided to the intended recipient only if the supervisory person approves the first electronic message.

14. The system of claim 13 wherein the intended recipient is a minor child and the supervisory person is a guardian for the minor child, and,to establish the supervisory relationship between the supervisory person and the intended recipient, the instructions include instructions for causing the at least one processing device to associate an electronic message address of the guardian with an electronic message address of the minor child.

15. The system of claim 13 wherein the intended recipient is an employee and the supervisory person is an employer for the employee, and, to establish the supervisory relationship between the supervisory person and the intended recipient, the instructions include instructions for causing the at least one processing device to associate an electronic message address of the employer with an electronic message address of the employee.

16. The system of claim 13 wherein, to deliver the first one of the electronic messages to the supervisory person, the instructions include instructions for causing the at least one processing device to:
examine a header of the first electronic message to determine whether the header includes the electronic message address of the intended recipient;

determine the electronic message address of the supervisory person associated with the electronic message address of the intended recipient; and route the first electronic message to the electronic message address of the supervisory person.

17. The system of claim 16 wherein the intended recipient and the supervisory person each have different electronic message addresses for a single Internet service provider account.

18. The system of claim 13 further comprising instructions stored on the storage device for causing the at least one processing device to:

examine a header of a second one of the electronic messages to determine an electronic address of the sender of the second electronic message;

compare the determined electronic address of the sender of the second electronic message to at least one sender list, and approve or reject the electronic message based on a result of the comparison.

19. The system of claim 18 wherein the at least one sender list includes a list of approved senders, and, to compare the determined electronic address of the sender of the second electronic message to the at least one sender list, the instructions include instructions for causing the at least one processing device to compare the determined electronic address to the list of approved senders.

20. The system of claim 18 wherein the at least one sender list includes a list of blocked senders, and, to compare the determined electronic address of the sender of the second electronic message to the at least one sender list, the instructions include instructions for causing the at least one processing device to compare the determined electronic address to the list of blocked senders.

21. The system of claim 13 wherein the electronic messages are e-mails and, to receive the electronic messages, the instructions include instructions for causing the at least one processing device to receive e-mails transmitted across a delivery network from one or more sender devices and directed to the intended recipient.

22. The system of claim 13 wherein the electronic messages are instant messages, and, to receive the electronic messages, the instructions include instructions for causing the at least one processing device to receive instant messages transmitted across a delivery network from one or more sender devices and directed to the intended recipient.

23. The system of claim 13 wherein the electronic messages are chat room messages and, to receive the electronic messages, the instructions include instructions for causing the at least one processing device to receive chat room messages transmitted across a delivery network from one or more sender devices and directed to the intended recipient.

24. The system of claim 13 further comprising instructions stored on the storage device for causing the at least one processing device to:

deliver a second one of the electronic messages to the supervisory person without notifying the intended recipient that the second electronic message has been delivered to the supervisory person; and forward or delete the second one of the electronic message if the supervisory person does not review and approve the second one of the electronic message within a period of time after delivery of the second one of the electronic message to the supervisory person.

25. A computer readable medium having embodied thereon a computer program for monitoring electronic messages that are directed to an intended recipient, the computer program comprising:

an establishing code segment that establishes a supervisory relationship between a supervisory person and an intended recipient wherein the establishing code segment comprises an associating code segment that establishes the supervisory relationship between the supervisory person and the intended recipient by, at least, associating an electronic message address of the supervisory person with an electronic message address of the intended recipient;

a receiving code segment that receives electronic messages transmitted across a delivery network from one or more sender devices and directed to the intended recipient;

a delivery code segment that delivers a first one of the electronic messages to the supervisory person without notifying the intended recipient that the first electronic message has been delivered to the supervisory person;

a review code segment that enables the supervisory person to review and approve the first electronic message after the first electronic message has been delivered to the supervisory person; and a notification code segment that enables notification of the first electronic message to be provided to the intended recipient only if the supervisory person approves the first electronic message.

26. The medium of claim 25 wherein the intended recipient is a minor child and the supervisory person is a guardian for the minor child such that the associating code segment associates an electronic message address of the guardian with an electronic message address of the minor child.

27. The medium of claim 25 wherein the intended recipient is an employee and the supervisory person is an employer for the employee such that the associating code segment associates an electronic message address of the employer with an electronic message address of the employee.

28. The medium of claim 25 wherein the delivery code segment comprises:

an examining code segment that examines a header of the first electronic message to determine whether the header includes the electronic message address of the intended recipient;

a determining code segment that determines the electronic address of the supervisory person associated with the electronic message address of the intended recipient; and a routing code segment that routes the first electronic message to the electronic message address of the supervisory person.

29. The medium of claim 28 wherein the intended recipient and the supervisory person each have different electronic message addresses for a single Internet service provider account.

30. The medium of claim 25 wherein the computer program further comprises:

an examining code segment that examines a header of a second one of the electronic messages to determine an electronic address of the sender of the second electronic message;

a comparing code segment that compares the determined electronic address of the second electronic message to at least one sender list, and an approving/rejecting code segment that approves or rejects the electronic message based on a result of the comparison.

31. The medium of claim 30 wherein the at least one sender list includes a list of approved senders such that the comparing code segment compares the determined electronic address to the list of approved senders.

32. The medium of claim 30 wherein the at least one sender list includes a list of blocked senders such that the comparing code segment compares the determined electronic address to the list of blocked senders.

33. The medium of claim 25 wherein the electronic messages are e-mails such that the receiving code segment receives e-mails transmitted across a delivery network from one or more sender devices and directed to the intended recipient.

34. The medium of claim 25 wherein the electronic messages are instant messages such that the receiving code segment receives instant messages transmitted across a delivery network from one or more sender devices and directed to the intended recipient.

35. The medium of claim 25 wherein the electronic messages are chat room messages such that the receiving code segment receives chat room messages transmitted across a delivery network from one or more sender devices and directed to the intended recipient.

36. The medium of claim 25 wherein the delivering code segment delivers a second one of the electronic messages to the supervisory person without notifying the intended recipient that the second electronic message has been delivered to the supervisory person, the computer program further comprising a forwarding/deleting code segment that automatically forwards or deletes the second electronic message if the supervisory person does not review and approve the second electronic message within a period of time after delivery of the second electronic message to the supervisory person.

* * * * *